Patented July 13, 1943

2,324,283

UNITED STATES PATENT OFFICE 2,324,283

DIAZINE DERIVATIVES

Gaetano F. D'Alelio, Pittsfield, Mass., assignor to General Electric Company, a corporation of New York No Drawing. Application February 28, 1942, Serial No. 432,895

16 Claims. (Cl. 260—251)

This invention relates to new chemical compounds and more particularly to diazine derivatives. The invention especially is concerned with the production of new and useful compounds corresponding to the following general formula:

I 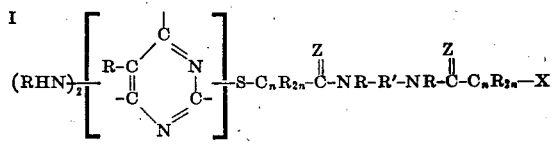

where $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, R' represents a member of the class consisting of divalent hydrocarbon and substituted hydrocarbon radicals, more particularly halo-hydrocarbon radicals, and X represents a halogen atom, more particularly chlorine, bromine, fluorine or iodine. These compounds are (diamino pyrimidyl thio aliphatic-amido or aliphatic-thionoamido) (halogeno aliphatic-amido or aliphatic-thionoamido) (derivatives of divalent hydrocarbons.

Illustrative examples of monovalent radicals that R in the above formula may represent are: aliphatic (e. g., methyl, ethyl, propyl, isopropyl, butyl, secondary butyl, isobutyl, butenyl, amyl, isoamyl, hexyl, octyl, methallyl, ethallyl, crotyl, etc., including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in Formula I is hydrogen. However, there also may be produced in accordance with the present invention compounds such, for instance, as those represented by the general formulas II 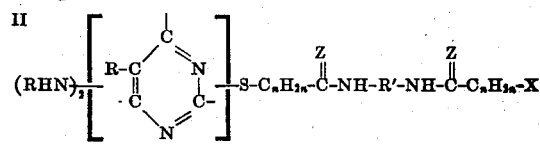

and, more particularly,

III 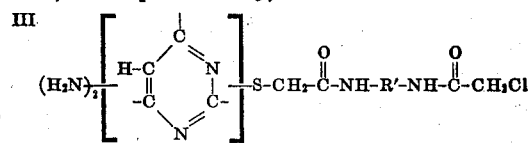

where $n$, Z, R, R' and X have the same meanings as given above with reference to Formula I.

Illustrative examples of divalent radicals that R' in the above formulas may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cycloheptylene, etc.; divalent aromatic, e. g., phenylene, xenylene, naphthylene, etc., divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenlypropylene, naphthylisobutylene, xylylene, alpha-(4-tolylene) beta'-butyl, etc.; radicals that may be classed either as divalent aliphatic-substituted aromatic or divalent aromatic-substituted aliphatic, e. g., 4, alpha-tolylene, 3, beta-phenyleneethyl, 4, alpha-xylylene, 2, gamma-phenylene-butyl, etc.; and their homologues, as well as those divalent radicals with one or more of their hydrogen atoms replaced by a substituent, e. g., halogeno, amino, acetyl, acetoxy, carboalkoxy, alkoxy, aryloxy, hydroxy, alkyl, alkenyl, etc. Specific examples of substituted divalent radicals are chloroethylene, chloropropylene, bromobutylene, chlorophenylene, chlorotolylene, bromophenylene, chloronaphthylene, bromonaphthylene, bromo 1,4-tolylene, chlorocyclopentylene, chlorocyclopentenylene, carbomethoxyphenylene, ethoxyphenylene, acetophenylene, acetoxyphenylene, bromocyclopentylene, amino-phenylene, phenoxyphenylene, methylphenylene (tolylene), allylphenylene, etc. Preferably R' is ethylene, phenylene or tolylene.

The new compounds of this invention may be used, for example, as pharmaceuticals, plasticizers, fungicides, insecticides, as an intermediate in the preparation of dyes and other chemical compounds, for instance as an intermediate in producing derivatives thereof such as ureido, hydrazino, carbamyl, amidine, methylol, etc., derivatives. These new compounds are especially valuable in the preparation of synthetic resinous compositions. Thus, they may be condensed with, for instance, aldehydes, including polymeric aldehydes, hydroxy aldehydes and aldehyde-addition products, to yield condensation products of particular utility in the plastics and coating arts. Such condensation products are more fully described and are specifically claimed in my copending application Serial No. 453,717, filed August 5, 1942, and assigned to the same assignee as the present invention. These new compounds also may be compounded with rubber, both natural and synthetic, to modify the properties of the rubber.

More specific examples of the chemical compounds of this invention are the (diamino pyrimidyl thio acetamido) (halogeno acetamido)-substituted aliphatic hydrocarbons, more particularly the (diamino pyrimidyl thio acetamido) (halogeno acetamido) alkanes, e. g., alpha-(4,6-diamino pyrimidyl-2 thio acetamido) beta-(chloroacetamido) ethane, alpha-(2,4-diamino pyrimidyl-6 thio acetamido) beta-(chloroacetamido) ethane, the alpha-(diamino pyrimidyl thio acetothionoamido) beta - (chloroacetothionoamido) ethanes, the (diamino pyrimidyl thio acetamido) (halogeno acetamido)-substituted aromatic hydrocarbons, e. g., the (diamino pyrimidyl thio acetamido) (halogeno acetamido) benzenes, the (diamino pyrimidyl thio acetothionoamido) (halogeno acetothionoamido) benzenes, the (diamino pyrimidyl thio acetamido) (halogeno acetamido) toluenes, etc.

Various methods may be employed to produce the chemical compounds with which this invention is concerned. I prefer to prepare them by effecting reaction between a bis-(halogeno aliphatic-amido)-substituted divalent compound or a bis-(halogeno aliphatic thionoamido)-substituted divalent compound and a mercapto diamino pyrimidine in the presence of a hydrohalide acceptor, the reactants being employed in the ratio of one mol of the mercapto diamino pyrimidine per mol of the said substituted divalent compound. Illustrative examples of substituted divalent compounds that may be used, depending on the end-product desired, are:

Bis-(chloroacetamido) ethane, more particularly alpha, beta-bis-(chloroacetamido) ethane
Bis-(chloroacetothionoamido) ethane, more particularly alpha, beta-bis-(chloroacetothionoamido) ethane
Bis-(chloroacetamido) propanes
Bis-(chloroacetothionoamido) propanes
Bis-(chloroacetamido) butanes
Bis-(chloroacetamido) pentanes
Bis-(chloroacetamido) benzenes
Bis-(chloroacetamido) toluenes
Bis-(chloroacetamido) xylenes
Bis-(chloroacetamido) naphthalenes
Bis-(chloroacetamido) octanes
Bis-(beta-chloropropanamido) propanes
Bis-(N-methyl alpha-bromopropanamido) propenes
Bis-(beta-iodopropanamido) butanes
Bis-(alpha-methyl beta-chloro N-isopropyl propanamido) chloroisobutanes
Bis-(alpha-butyl beta-bromo N-ethyl propanamido) pentanes
Bis-(alpha-phenyl beta-chloro octanamido) isopentanes
Bis-(beta-chlorophenyl beta-bromo N-cyclopentyl butanthionoamido) cyclopentanes
Bis-(alpha, alpha-ditolyl beta-chloro propanamido) cyclopentanes
Bis-(alpha-xylyl alpha-bromo N-phenyl butanamido) cyclohexanes
Bis-(alpha-chlorotolyl alpha-methyl beta-chloro pentanamido) chlorocyclohexenes
Bis-(N-tolyl chloroacetothionoamido) cycloheptanes
Bis-(beta-bromopropanamido) benzenes
Bis-(beta-chloro N-benzyl 4-pentenamido) biphenyls
Bis-(bromocyclopentyl chloro N-naphthyl acetamido) naphthalenes
Bis-(bromoacetamido) ethane, more particularly alpha, beta-bis-(bromoacetamido) ethane
2,4-bis-(cyclohexenyl bromo acetothionoamido) chlorotoluene
2,5-bis-(beta-phenyl alpha-chloro N-chlorophenyl propanamido) ethylbenzene
3,4 - bis -(beta - bromopropanamido) propylbenzene
4,4'-bis-(N-bromoethyl chloroacetamido) diphenylmethane
Alpha, gamma-bis-(N-xenyl chloroacetamido) phenylpropane
Alpha, alpha'-bis-(beta-chloroheptanthionoamido) xylene
2,4 - bis -(cyclopentenyl chloro N - aminophenyl acetamido) 1-isobutyl naphthalene
Bis-(fluoroacetamido) benzenes
Alpha, beta-bis-(omega-chloro alpha-bromo N-butylphenyl pentanamido) phenylethane
Bis-(bromoacetamido) propanes
Bis-(bromoacetamido) butanes
Bis-(bromoacetamido) benzenes
Bis-(bromoacetamido) toluenes Illustrative examples of diamino mercapto pyrimidines that may be employed, depending upon the particular end-product sought, are:

2-mercapto 4,6-diamino pyrimidine
4-mercapto 2,6-diamino pyrimidine
2-mercapto 4-bromotoluido 6-benzylamino pyrimidine
2-toluido 4-mercapto 6-methylamino pyrimidine
2-mercapto 4-phenylchloroethylamino 6 - phenethylamino pyrimidine
2-mercapto 4-chloroanilino 6-ethylphenylamino pyrimidine
2-mercapto 4-cycloheptylamino 6-isopropylamino pyrimidine
2-mercapto 4,6-diamino 5-methyl pyrimidine
4-mercapto 2,6-diamino 5-methyl pyrimidine
2-mercapto 4,6-di-(methylamino) pyrimidine
4-mercapto 2,6-di-(methylamino) pyrimidine
2-mercapto 4,6-di-(methylamino) 5-methyl pyrimidine
4-mercapto 2,6-di-(methylamino) 5-phenyl pyrimidine
2-mercapto 4-chloroethylamino 6-methylamino pyrimidine
2-mercapto 4,6-di-(anilino) pyrimidine
2-mercapto 4,6-di-(anilino) 5-butyl pyrimidine 2-mercapto 4-xenylamino 5-cyclopentyl 6-amylamino pyrimidine
2-toluido 4-mercapto 5-cyclohexenyl 6-amino pyrimidine (2-toluido 4-amino 5-cyclohexenyl 6-mercapto pyrimidine)
2-mercapto 4-amino 6-ethylamino pyrimidine
2-mercapto 4,6-di-(propylamino) pyrimidine
2-allylamino 4-mercapto 6-chlorophenylamino pyrimidine
2-amylamino 4-mercapto 5-phenyl 6-amino pyrimidine
2-dichloroanilino 4-mercapto 5-tolyl 6-propylamino pyrimidine
2-cycloheptylamino 4-mercapto 6-isobutylamino pyrimidine
2-mercapto 4-allylamino 6-butylamino pyrimidine
2-mercapto 4-(3'-butenylamino) 6-isopropylamino pyrimidine
2-mercapto 4-isobutylamino 6-cyclopentylamino pyrimidine
2-mercapto 4-amino 6-chloroxenylamino pyrimidine
2-mercapto 4-ethylphenylamino 5-naphthyl 6-xylidino pyrimidine

IV

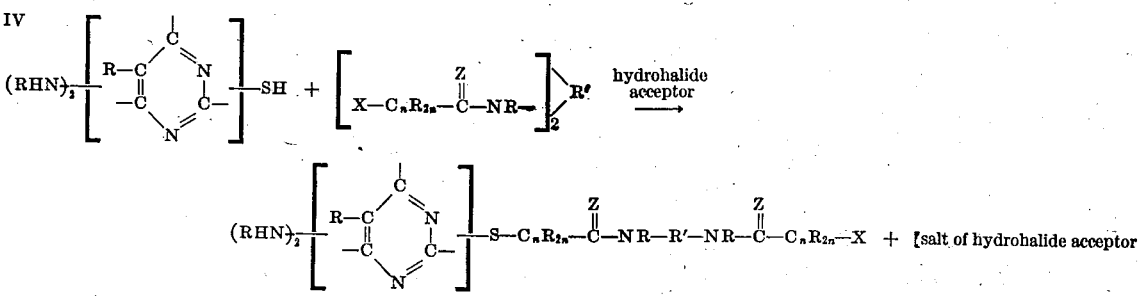

2-mercapto 4-isopropylanilino 5-benzyl 6-benzylamino pyrimidine
2-mercapto 4-phenethylamino 5-(2'-butenyl) 6-cyclopentenylamino pyrimidine
2-mercapto 4,6-diamino 5-bromotolyl pyrimidine
2-mercapto 4-amino 5-phenylisopropyl 6-chlorocyclohexylamino pyrimidine
2-mercapto 4-isobutylamino 6-bromonaphthylamino pyrimidine
2-mercapto 4,6-diamino 5-phenylpropyl pyrimidine
2-mercapto 4-chlorobenzylamino 5-chlorobutyl 6-bromoethylamino pyrimidine
2-mercapto 4-amino 5-ethylchlorophenyl 6-sec.-butylamino pyrimidine
2-mercapto 4-pentylamino 6-cyclohexylamino pyrimidine
2-mercapto 4-n-hexylamino 6-xenylamino pyrimidine
2-mercapto 4-cyclohexenylamino 6-naphthylamino pyrimidine
2-mercapto 4-amino 6-bromoethylamino pyrimidine
2-mercapto 4-amino 6-methylamino pyrimidine
2-mercapto 4-aminoanilino 6-ethylphenylamino pyrimidine
2-mercapto 4-amino 6-benzylamino pyrimidine
2-mercapto 4-chlorocyclopentylamino 6-toluido pyrimidine Various hydrohalide acceptors may be employed. I prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the bis-(halogeno aliphatic-amido) or bis-(halogeno aliphatic-thionoamido) substituted divalent compound may be carried out in any suitable manner, but preferably is effected in the presence of a suitable solvent or mixture of solvents. Although various solvents and solvent mixtures may be employed, I prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

In the above equation $n$, $Z$, $R$, $R'$ and $X$ have the same meanings as given above with reference to Formula I.

In order that those skilled in the art better may understand how the present invention may be carried into effect, the following illustrative examples are given. All parts are by weight.

*Example 1*

This example illustrates the preparation of alpha-(4,6-diamino pyrimidyl-2 thio acetamido) beta-(chloroacetamido) ethane, the formula for which is

V

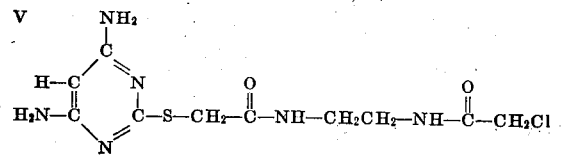

|  | Parts | Approximate mol ratios |
| --- | --- | --- |
| 2-mercapto 4,6-diamino pyrimidine | 71.0 | 1 |
| Alpha, beta-bis-(chloroacetamido) ethane | 106.5 | 1 |
| Sodium hydroxide | 20.0 | 1 |

The 2-mercapto 4,6-diamino pyrimidine was dissolved in a solution of the stated amount of sodium hydroxide dissolved in 200 parts of water, resulting in the formation of the sodium salt of the pyrimidine derivative. The bis-(chloroacetamido) ethane was added to a mixture of 1,000 parts water and 250 parts alcohol, to which then was added the solution of the sodium salt of the pyrimidine derivative. The resultant mixture was heated on a steam plate for a short while. A crystalline precipitate formed on cooling the reaction mass to room temperature. The precipitate comprising alpha-(4,6-diamino pyrimidyl-2 thio acetamido) beta-(chloroacetamido) ethane was filtered off, washed free of water-soluble salts and then dried.

*Example 2*

Alpha-(2,6-diamino pyrimidyl-4 thio acetamido) beta-(chloroacetamido) ethane is prepared in essentially the same manner as described under Example 1 with the exception that, instead of 71 parts 2-mercapto 4,6-diamino pyrimidine, there is used 71 parts of 4-mercapto 2,6-diamino pyrimidine.

*Example 3*

Alpha-(4,6-diamino pyrimidyl-2 thio acetothionoamido) beta-(chloroacetothionoamido) ethane is prepared in essentially the same manner as described under Example 1 with the exception that, instead of alpha, beta-bis-(chloroacetamido) ethane, an equivalent amount of alpha, beta-bis-(chloroacetothionoamido) ethane is employed.

*Example 4*

A (4,6-diamino pyrimidyl-2 thio acetamido) (chloroacetamido) benzene is produced in essentially the same manner as described under Example 1 with the exception that, instead of alpha, beta-bis-(chloroacetamido) ethane, an equivalent amount of a bis-(chloroacetamido) benzene is used.

*Example 5*

A (4,6-diamino pyrimidyl-2 thio acetamido) (chloroacetamido) toluene is produced in essentially the same manner as described under Example 1 with the exception that, instead of alpha, beta-bis-(chloroacetamido) ethane, an equivalent amount of a bis-(chloroacetamido) toluene is employed.

*Example 6*

Alpha-(4,6-diamino pyrimidyl-2 thio acetamido) beta-(bromoacetamido) ethane is prepared in essentially the same manner as described under Example 1 with the exception that, instead of alpha, beta-bis-(chloroacetamido) ethane, an equivalent amount of alpha, beta-bis-(bromoacetamido) ethane is used.

Other examples of the new chemical compounds of this invention are listed below:

(Diamino pyrimidyl thio acetamido) (chloroacetamido) propanes, including the (4,6-diamino pyrimidyl-2 thio acetamido) (chloroacetamido) propanes and the (2,6-diamino pyrimidyl-4 thio acetamido) (chloroacetamido) propanes (Diamino pyrimidyl thio acetothionoamido) (bromoacetothionoamido) propanes (Diamino pyrimidyl thio acetamido) (chloroacetamido) butanes (Diamino pyrimidyl thio acetamido) (iodoacetamido) pentanes (Diamino pyrimidyl thio acetamido) (fluoroacetamido) octanes (Diamino pyrimidyl thio acetamido) (chloroacetamido) chlorobutanes (Diamino pyrimidyl thio acetamido) (chloroacetamido) chlorobenzenes (Diamino pyrimidyl thio acetamido) (bromoacetamido) toluenes (Diamino pyrimidyl thio acetamido) (chloroacetamido) xylenes (Diamino pyrimidyl thio acetamido) (chloroacetamido) naphthalenes (Diamino pyrimidyl thio acetamido) (chloroacetamido) ethyl benzenes (Diamino pyrimidyl thio acetothionoamido) (chloroacetothionoamido) cyclohexanes (Diamino pyrimidyl thio acetamido) (chloroacetamido) butenes (Diamino pyrimidyl thio acetamido) (chloroacetamido) cyclohexenes (Diamino pyrimidyl thio acetamido) (bromoacetamido) bromo-benzenes (Diamino pyrimidyl thio acetamido) (chloroacetamido) chloronaphthalenes Alpha-(diamino pyrimidyl alpha'-thio propanamido) beta-(alpha''-chloro propanamido) ethane, including alpha-(4,6-diamino pyrimidyl-2 alpha'-thio propanamido) beta-(alpha''-chloro propanamido) ethane and alpha-(2,6-diamino pyrimidyl-4 alpha'-thio propanamido) beta-(alpha''-chloro propanamido) ethane Alpha-(diamino pyrimidyl beta'-thio propanamido) beta-(beta''-bromo propanamido) ethane, including alpha-(4,6-diamino pyrimidyl-2 beta'-thio propanamido) beta-(beta''-bromo propanamido) ethane and alpha-(2,6-diamino pyrimidyl-4 beta'-thio propanamido) beta-(beta''-bromo propanamido) ethane (Diamino pyrimidyl alpha-thio propanamido) (alpha'-chloro propanamido) propanes (Diamino pyrimidyl beta-thio propanamido) (beta'-chloro propanamido) propanes (Diamino pyrimidyl alpha-thio propanamido) (alpha'-bromo propanamido) butanes (Diamino pyrimidyl beta-thio propanamido) (beta'-iodo propanamido) pentanes (Diamino pyrimidyl alpha-thio propanamido) (alpha'-fluoro propanamido) hexanes (Diamino pyrimidyl beta-thio propanamido) (beta'-chloro propanamido) cyclopentanes (Diamino pyrimidyl alpha-thio propanamido) (alpha'-chloro propanamido) benzenes (Diamino pyrimidyl beta-thio propanamido) (beta'-chloro propanamido) benzenes (Diamino pyrimidyl alpha-thio propanamido) (alpha'-chloro propanamido) toluenes (Diamino pyrimidyl beta-thio propanamido) (beta'-bromo propanamido) toluenes (Diamino pyrimidyl alpha-thio propanamido) (alpha'-iodo propanamido) xylenes (Diamino pyrimidyl beta-thio propanamido) (beta'-chloro propanamido) xylenes (Diamino pyrimidyl alpha-thio propanamido) (alpha'-fluoro propanamido) ethylbenzenes (Diamino pyrimidyl beta-thio propanamido) (beta'-chloro propanamido) naphthalenes (Diamino pyrimidyl alpha-thio propanamido) alpha'-chloro propanamido) chloronaphthalenes (Diamino pyrimidyl beta-thio propanamido) (beta'-bromo propanamido) bromobenzenes (Diamino pyrimidyl alpha-thio propanamido) (alpha'-chloro propanamido) chlorobutanes (Diamino pyrimidyl beta-thio propanamido) (beta'-chloro propanamido) anthracenes (Diamino pyrimidyl alpha-thio propanthionoamido) (alpha'-chloro propanthionoamido) benzenes (Diamino pyrimidyl beta-thio propanthionoamido) (beta'-bromo propanthionoamido) toluenes Alpha-(4,6-di-[methylamino] 5-methyl pyrimidyl-2 thio methyl N-methyl acetamido) gamma-(methyl N'-methyl bromoacetamido) propene
(4-chloroethylamino 6-methylamino pyrimidyl-2 beta-thio propanamido) (beta'-iodo propanamido) butanes
(4,6-di-[anilino] 5-butyl pyrimidyl-2 beta-thio alpha - methyl N - isopropyl propanamido) (alpha'-methyl beta'-chloro N'-isopropyl propanamido) chloroisobutanes
(4 - xenylamino 5-cyclopentyl 6-pentylamino pyrimidyl-2 beta-thio alpha-butyl N-ethyl propanamido) (alpha'-butyl beta'-bromo N'-ethyl propanamido) pentanes
(2-toluido 4-amino 5-cyclohexenyl pyrimidyl-6 beta-thio beta-methyl beta-chlorophenyl N-cyclopentyl propanthionoamido) (beta'-methyl beta'-chlorophenyl beta'-bromo N'-cyclopentyl propanthionoamido) cyclopentanes
(2-allylamino 4-amino 5-phenyl pyrimidyl-6 beta-thio alpha, alpha-ditolyl propanamido) (alpha', alpha'-ditolyl beta'-chloro propanamido) cyclopentenes
(2-isopentylamino 4-chlorophenylamino pyrimidyl-6 thio ethyl xylyl acetamido) (ethyl xylyl chloroacetamido) cyclohexanes
(2-dichloroanilino 4-propylamino 5-tolyl pyrimidyl-6 thio N-tolyl acetothionoamido) N-tolyl chloroacetothionamido) cycloheptanes
(2-cyclohexylamino 4-isobutylamino pyrimidyl-6 beta-thio propanamido) (beta'-bromo propanamido) benzenes
(4-chloroxenylamino 6-amino pyrimidyl-2 beta-thio beta-vinyl N-benzyl propanamido) (beta'-vinyl beta'-chloro N'-benzyl propanamido) biphenyls
(4-xylidino 5-naphthyl 6-ethylanilino pyrimidyl-2 thio bromocyclopentyl acetamido) (bromocyclopentyl chloro acetamido) naphthalenes
4-(4'-benzylamino 5'-benzyl 6'-isopropylanilino pyrimidyl-2' thio cyclohexenyl acetothionoamido) 2-(cyclohexenyl bromo acetothionoamido) chlorotoluene
5-(4'-cyclopentenylamino 5'-(2''-butenyl) 6'-phenethylamino pyrimidyl-2' thio benzyl acetamido) 2-(benzyl chloro acetamido) ethylbenzene
4-(4',6'-diamino 5'-bromotolyl pyrimidyl-2' beta-thio propanamido) 3-(beta'-bromo propanamido) isopropylbenzene
(4-chlorocyclohexylamino 5-phenylisopropyl 6-amino pyrimidyl-2 thio acetamido) (chloroacetamido) diphenylmethanes
1-(4'-isobutylamino 6'-bromonaphthylamino pyrimidyl-2' thio cyclopentenyl acetamido) 2-cyclopentenyl chloroacetamido) 4-isobutylnaphthalene
Alpha-(4,6-diamino 5-phenylpropyl pyrimidyl-2-thio chloropropyl acetamido) beta-(chloropropyl bromo acetamido) alpha-phenylethane
Alpha-(4-chlorobenzylamino 5-chlorobutyl 6-bromoethylamino pyrimidyl-2 thio acetamido) gamma-(chloroacetamido) alpha-phenylpropane It will be understood, of course, by those skilled in the art that, in those compounds listed above that are generically named, the described substituent groupings may be attached to any two positions of the divalent compound represented by R' in Formula I. It also will be understood that the expression "diamino pyrimidyl" includes both the 4,6-diamino pyrimidyl-2 and the 2,6-diamino pyrimidyl-4 (2,4-diamino pyrimidyl-6) derivatives.

In a manner similar to that described above with particular reference to the diamino [(—NHR)$_2$] pyrimidine (1,3-diazine) derivatives, corresponding derivatives of the 1,2-diazines and of the 1,4-diazines may be prepared. It also will be understood by those skilled in the art from the foregoing description of the preparation of the diazinyl monosulfides that similar compounds may be prepared in which two or three sulfur linkages are attached to the diazine nucleus.

What I claim as new and desire to secure by Letters Patent of the United States is:

1. Chemical compounds corresponding to the general formula $$(RHN)_2-\left[\begin{array}{c} R-C \\ \| \\ -C \end{array} \begin{array}{c} C \\ \diagup \diagdown \\ N \\ \diagdown \diagup \\ N \end{array} \begin{array}{c} N \\ \| \\ C- \end{array}\right]-S-C_nR_{2n}-\overset{Z}{\underset{\|}{C}}-NR-R'-NR-\overset{Z}{\underset{\|}{C}}-C_nR_{2n}-X$$

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

2. Chemical compounds as in claim 1 wherein R represents hydrogen.

3. Chemical compounds as in claim 1 wherein X represents chlorine.

4. Chemical compounds as in claim 1 wherein R represents hydrogen, Z represents a member of the class consisting of oxygen and sulfur, and $n$ is 1.

5. Chemical compounds as in claim 1 wherein R represents hydrogen, Z represents a member of the class consisting of oxygen and sulfur, $n$ is 1, and X represents chlorine.

6. Chemical compounds corresponding to the general formula $$(RHN)_2-\left[\begin{array}{c} R-C \\ \| \\ -C \end{array} \begin{array}{c} C \\ \diagup \diagdown \\ N \\ \diagdown \diagup \\ N \end{array} \begin{array}{c} N \\ \| \\ C- \end{array}\right]-S-C_nH_{2n}-\overset{Z}{\underset{\|}{C}}-NH-R'-NH-\overset{Z}{\underset{\|}{C}}-C_nH_{2n}-X$$

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom.

7. Chemical compounds corresponding to the general formula $$(H_2N)_2-\left[\begin{array}{c} H-C \\ \| \\ -C \end{array} \begin{array}{c} C \\ \diagup \diagdown \\ N \\ \diagdown \diagup \\ N \end{array} \begin{array}{c} N \\ \| \\ C- \end{array}\right]-S-CH_2-\overset{O}{\underset{\|}{C}}-NH-R'-NH-\overset{O}{\underset{\|}{C}}-CH_2Cl$$

where R' represents a member of the class consisting of divalent hydrocarbon and halo-hydrocarbon radicals.

8. A (diamino pyrimidyl thio acetamido) (halogeno acetamido)-substituted aliphatic hydrocarbon.

9. A (diamino pyrimidyl thio acetamido) (halogeno acetamido) alkane.

10. Alpha-(4,6-diamino pyrimidyl-2 thio acetamido) beta-(chloroacetamido) ethane.

11. A (diamino pyrimidyl thio acetamido) (halogeno acetamido)-substituted aromatic hydrocarbon.

12. A (diamino pyrimidyl thio acetamido) (halogeno acetamido) benzene.

13. A (diamino pyrimidyl thio acetamido) (halogeno acetamido) toluene.

14. The method of preparing chemical compounds corresponding to the general formula

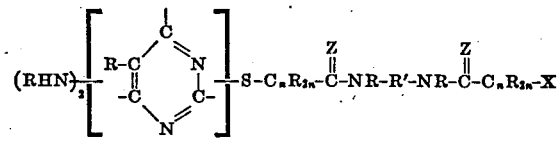

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, R' represents a member of the class consisting of divalent hydrocarbon and halo-hydrocarbon radicals, and X represents a halogen atom, said method comprising effecting reaction, in the presence of a hydrohalide acceptor, between equimolecular proportions of (1) a mercapto pyrimidine corresponding to the general formula

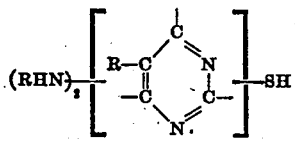

where R has the meaning above given, and (2) a compound corresponding to the general formula

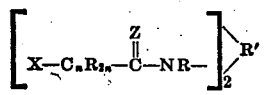

where $n$ Z R, R' and X have the meanings above given.

15. A method as in claim 14 wherein the hydrohalide acceptor is an alkali-metal hydroxide.

16. A method of preparing alpha-(4,6-diamino pyrimidyl-2 thio acetamido) beta-(chloroacetamido) ethane which comprises effecting reaction, in the presence of a hydrohalide acceptor, between equimolecular proportions of 2-mercapto 4,6-diamino pyrimidine and alpha, beta-bis-(chloroacetamido) ethane.

GAETANO F. D'ALELIO.

Certificate of Correction

Patent No. 2,324,283.                                                                          July 13, 1943

GAETANO F. D'ALELIO.

It is hereby certified that errors appear in the printed specification of the above numbered patent requiring correction as follows: Page 1, first column, line 26, strike out the opening parenthesis before the syllable "de-"; and second column, line 4-9, for that portion of the formula reading

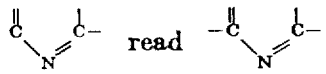

line 31-32, for "phenlypropylene" read *phenylpropylene*; page 3, second column, line 35, in the formula, before the word "salt" strike out the bracket; page 5, first column, line 37, for "chloroacetothionamido" read *chloroacetothionoamido*; line 66, strike out the hyphen after "pyrimidyl-2"; page 6, second column, line 20, for "n Z" read *n, Z*; and that the said Letters Patent should be read with these corrections therein that the same may conform to the record of the case in the Patent Office.

Signed and sealed this 14th day of September, A. D. 1943.

[SEAL]

HENRY VAN ARSDALE,
                                                                                  *Acting Commissioner of Patents.*